United States Patent Office 2,716,660
Patented Aug. 30, 1955

2,716,660

ACETAL TELOMERS

Tracy M. Patrick, Jr., Dayton, Ohio, assignor to Monsanto Chemical Company, St. Louis, Mo., a corporation of Delaware No Drawing. Application November 27, 1950,
Serial No. 197,829

16 Claims. (Cl. 260—484)

This invention relates to novel telomeric compositions obtained by the free radical induced interaction of an acetal with polyesters of 4 to 6 carbon atom monoethylenic unsaturated polycarboxylic acids and to the process for their preparation.

More specifically this invention relates to the discovery that acetals can be reacted with polyesters of 4 to 6 carbon atom mono-ethylenic unsaturated polycarboxylic acids, wherein the ethylenic bond is conjugated with at least one carbonyl group, selected from the group consisting of maleates, fumarates, citraconates, mesaconates, itaconates, aconitates and glutaconates in the presence of a free radical promoting agent to provide telomeric reaction products.

The definitions pertaining to "telomers" and "telomerization" are to be found in U. S. Patent 2,440,800, wherein said terms were defined so as to provide adequate means for distinguishing reactions such as those as herein disclosed from conventional polymerization reactions.

The term "acetal" as employed herein is the generic expression employed to embrace the condensation products of one mole equivalent of a saturated aldehyde with two mole equivalents of a saturated monohydric alcohol, which products are defined by the structural formula

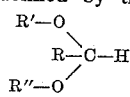

wherein R is a saturated hydrocarbon radical selected from the group consisting of hydrogen, alkyl, cycloalkyl and aralkyl radicals, and R′ and R″ are saturated hydrocarbon radicals. Preferably R is an alkyl radical containing up to 7 carbon atoms. R′ and R″ preferably contain up to 7 carbon atoms and more preferably are identical alkyl radicals.

The term "saturated" as used herein excepts normal benzene ring unsaturation since benzene does not give any reaction with bromine water and practically all of its reactions are those of substitution instead of addition.

Illustrative acetals are, for example,

Dimethoxymethane
Diethoxymethane
1,1-dimethoxyethane
1,1-diethoxyethane
1,1-diethoxybutane
1,1-diethoxyheptane
1,1-dipropoxyheptane
1,1-dibutoxyethane
1,1-(di-2-ethylhexoxy)butane
1,1-didodecoxydodecane
1-methoxy-1-ethoxyethane
1-propoxy-1-butoxybutane
1,1-dicyclopropoxyheptane
1,1-dicyclohexoxybutane
1,1-dibenzyloxyethane
1,1-diphenethoxybutane
1,1-diphenoxyheptane
1,1-ditoloxybutane
1-ethoxy-1-cyclohexoxypropane
1-benzyloxy-1-phenoxyhexane
1-cyclopropoxy-1-toloxypentane
1-ethoxy-1-phenethoxyethane
Diethoxycyclohexylmethane
Dibutoxycyclopropylmethane
1,1-dimethoxy-2-phenylethane
1,1-dipropoxy-2-tolylethane and the like.

The saturated hydrocarbon radicals of the aforementioned polyesters, R′″ as appearing below, can be selected from the group consisting of alkyl, aryl, alkaryl, aralkyl and cycloalkyl radicals, as for example, methyl, ethyl, propyl, butyl, hexyl, 2-ethylhexyl, dodecyl, tetradecyl, octadecyl, phenyl, biphenylyl, naphthyl, tolyl, xylyl, mesityl, cumyl, benzyl, phenethyl, cyclopropyl, cyclohexyl, bicyclohexylyl, tetrahydronaphthyl, decahydronaphthyl, tetrahydroabietyl, dehydroabietyl and the like and mixtures thereof. Accordingly the said saturated hydrocarbon radical of the ester group preferably contains up to about 20 carbon atoms and more preferably still up to about 8 carbon atoms.

In general it is preferable that the ester groups be identical since it is not economical to esterify preferentially the polycarboxylic acid with mixed alcohols to obtain substantially homogeneous products. Illustrative polyesters are, for example, diethyl fumarate, dibutyl itaconate, diethyl itaconate, tributyl aconitate, dimethyl mesaconate, diethyl glutaconates, dibutyl citraconate, diethyl citraconate, dimethyl citraconate, dihexyl maleate, ditetradecyl maleate, dicyclohexyl maleate, dibenzyl maleate, diphenyl maleate, ditolyl maleate and the like. The dimethyl, diethyl, dibutyl, and di-(2-ethylhexyl) maleates are currently readily commercially available and are preferred reactants due to their symmetrical structure.

The telomeric compositions of this invention can be diagrammatically represented by the structural formula

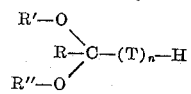

wherein R, R′ and R″ are as defined above, $n$ is an integer greater than 1, and T is a taxomon of the aforementioned monoethylenic unsaturated polyesters. In general, $n$ is an integer and can range from about 2 to about 20 and preferably from about 2 to about 5 for an isolated telomer. However, the mixed telomeric compositions are suitable for most purposes without separation into their component parts, thus the average value of $n$ will generally be a mixed number greater than 2. Where Q represents the radical —COOR′″ the taxomons can be diagrammatically represented as follows:

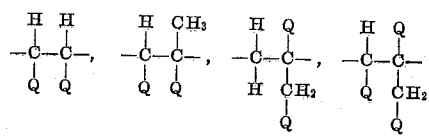

and

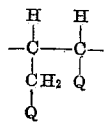

The term "free radical promoting agent" as used herein embraces ultraviolet radiation and free radical promoting catalysts. The free radical promoting catalysts are, for example, acetyl peroxide, t-butyl peroxide, t-butyl hydroperoxide, benzoyl peroxide, lauroyl peroxide, stearoyl peroxide, hydrogen peroxide, peracetic acid, sodium perborate, potassium persulfate and the like. The free radical promoting catalyst is generally employed at from about 0.1 to about 5 mole per cent and preferably from about 0.25 to about 2 mole per cent based on the weight of the total reactants; and the catalyst may be added all at once, in increments or continuously over a period of time.

The temperature at which the reaction is maintained is not critical. The temperature may range from —50° C. to the decomposition point of the reactants but the range of from about 25° C. to about 100° C. is preferred. In general the temperature should be selected such that the free radical promoting catalyst is decomposed at a moderate rate during the course of the reaction, for example, if benzoyl peroxide is the free radical promoting catalyst a temperature in the range of from about 70° C. to about 90° C. is preferred.

The pressure should preferably be sufficient to maintain the reactants in a liquid state during the reaction, thus relatively volatile reactants should be processed in a pressure vessel. In general, however, a reaction vessel equipped with a reflux condenser is suitable for most reactants.

The mole ratio of the acetal to the mono-ethylenic polyester can vary over a wide range, the preferred range being from about 4:1 to about 1:4 and more generally an excess of the polyester is preferred although ratios outside these limits are operable.

The reaction can be brought about by the direct mixing of the reactants as shown in the example below, can be brought about in the presence of an inert organic solvent, e. g., benzene, cyclohexane, hexane and the like, or the acetal can be added stepwise to the polyester throughout the course of the reaction. Proper agitation, e. g., refluxing, stirring, rocking, passing an inert gas through the system, should be maintained to provide adequate mixing of the reactants.

The following example is illustrative of this invention.

A mixture of 118 g. (1.0 mole) of freshly distilled 1,1-diethoxyethane and 43.0 g. (0.25 mole) of redistilled diethyl maleate was introduced into a reaction vessel fitted with a reflux condenser. The mixture was brought to reflux (102° C.) and a mixed free radical promoting catalyst consisting of 1.0 cc. of t-butyl peroxide and 0.5 g. of benzoyl peroxide was added thereto. Additional 0.5 g. samples of benzoyl peroxide were added after 17 and 25.5 hours reaction at reflux temperature. Heating was discontinued after 42 hours. The unreacted 1,1-diethoxyethane and diethyl maleate and the 1:1 adduct were recovered by fractional distillation. A pale yellow viscous liquid residue which did not distill at a pot temperature of 200° C. and 0.6 mm. of mercury was obtained in the amount of 24.5 g. This telomeric residue had a refractive index of 1.4558 at 25° C.

In a similar manner 1,1-diethoxyethane can be reacted with di(2-ethylhexyl) maleate, 1,1-dimethoxyethane can be reacted with diethyl fumarate, 1,1-diethoxyethane can be reacted with diethyl itaconate, 1,1-diethoxyethane can be reacted with tributyl aconitate, and the like to produce telomeric compositions having the following structural formulas:

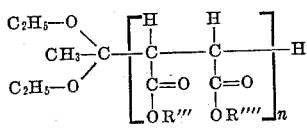

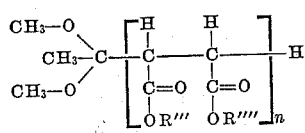

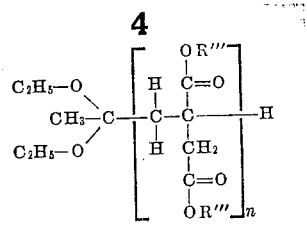

and

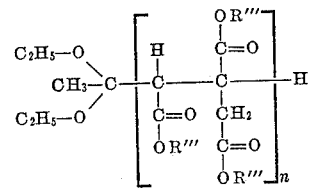

and the like, wherein $n$ is an integer from 2 to 5.

The copending application of J. E. Fields, Serial Number 197,837, filed November 27, 1950, now U. S. 2,652,369, discloses and claims the novel compositions comprising the telomeric product and hydrocarbon oils wherein said compositions are characterized by a substantial reduction of the detrimental ability to foam.

The novel telomeric compositions of this invention are useful as lubricants, lubricant additives, softeners for synthetic rubber, wax composition additives and antifoam agents.

I claim:

1. The telomeric composition.

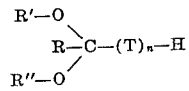

wherein R is selected from the group consisting of hydrogen, alkyl, cycloalkyl and aralkyl radicals, said hydrocarbon radicals containing up to 7 carbon atoms and being free from non-benzenoid unsaturation; R' and R" are hydrocarbon radicals containing up to 7 carbon atoms, which are free from non-benzenoid unsaturation; T is a divalent radical selected from the group consisting of

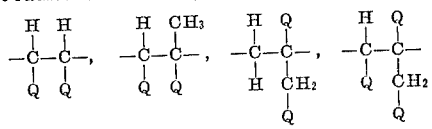

and

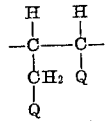

wherein Q is the radical —COOR''' and R''' is a hydrocarbon radical, free from non-benzenoid unsaturation, containing up to 8 carbon atoms; and $n$ is an integer from 2 to 20.

2. The telomeric composition

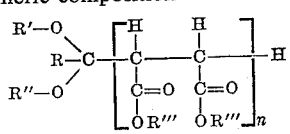

wherein R, R' and R" are alkyl radicals containing up to 7 carbon atoms; R''' is a hydrocarbon radical free from non-benzenoid unsaturation containing up to 8 carbon atoms; and $n$ is an integer from 2 to 5.

3. The telomeric composition

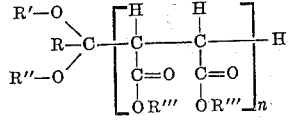

wherein R, R' and R" are alkyl radicals containing up to 7 carbon atoms; R''' is an alkyl radical containing up to 8 carbon atoms; and $n$ is an integer from 2 to 5.

4. The telomeric composition

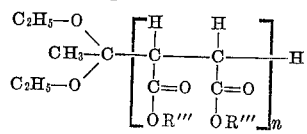

wherein R''' is an ethyl radical and $n$ is an integer from 2 to 5.

5. The telomeric composition

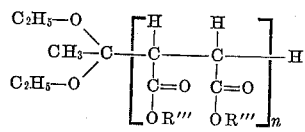

wherein R''' is a 2-ethylhexyl radical and $n$ is an integer from 2 to 5.

6. The telomeric composition

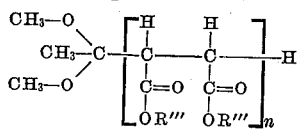

wherein R''' is an ethyl radical and $n$ is an integer from 2 to 5.

7. The telomeric composition

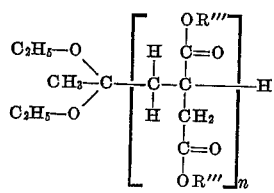

wherein R''' is an ethyl radical and $n$ is an integer from 2 to 5.

8. The telomeric composition

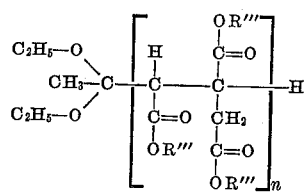

wherein R''' is a butyl radical and $n$ is an integer from 2 to 5.

9. The process of preparing telomeric compositions comprising the reaction of (A) an acetal having the formula

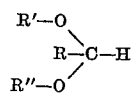

wherein R is a hydrocarbon radical, free from benzenoid unsaturation, containing up to 7 carbon atoms; and R' and R''' are hydrocarbon radicals, free from non-benzenoid unsaturation, containing up to 7 carbon atoms; with (B) a polyester of a 4 to 6 carbon atom mono-ethylenic unsaturated polycarboxylic acid, wherein the ethylenic bond is conjugated with at least one carbonyl group, selected from the group consisting of maleates, fumarates, citraconates, mesaconates, itaconates, aconitates and glutaconates; in the presence of (C) a free radical promoting agent selected from the group consisting of ultraviolet radiation and peroxygen catalysts.

10. The process of preparing telomeric compositions comprising the reaction of (A) an acetal having the formula

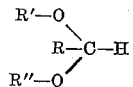

wherein R, R' and R'' are alkyl radicals containing up to 7 carbon atoms, with (B) a diester maleate wherein the ester radical is a hydrocarbon radical, free from non-benzenoid unsaturation, containing up to 8 carbon atoms, in the presence of (C) a free radical promoting peroxygen catalyst.

11. The process of preparing telomeric compositions comprising the reaction of (A) an acetal having the formula

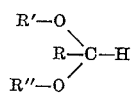

wherein R, R' and R'' are alkyl radicals containing up to 7 carbon atoms, with (B) a dialkylester maleate wherein the alkyl radical contains up to 8 carbon atoms, in the presence of (C) a free radical promoting peroxygen catalyst.

12. The process of preparing a telomeric composition comprising the reaction of (A) 1,1-diethoxyethane with (B) diethyl maleate in the presence of (C) a mixture of t-butyl peroxide and benzoyl peroxide.

13. The process of preparing a telomeric composition comprising the reaction of (A) 1,1-diethoxyethane with (B) di(2-ethylhexyl) maleate in the presence of (C) benzoyl peroxide.

14. The process of preparing a telomeric composition comprising the reaction of (A) 1,1-dimethoxyethane with (B) diethyl fumarate in the presence of (C) benzoyl peroxide.

15. The process of preparing a telomeric composition comprising the reaction of (A) 1,1-diethoxyethane with (B) diethyl itaconate in the presence of (C) benzoyl peroxide.

16. The process of preparing a telomeric composition comprising the reaction of (A) 1,1-diethoxyethane with (B) tributyl aconitate in the presence of (C) benzoyl peroxide.

No references cited.